United States Patent
Schmitz

(10) Patent No.: US 6,345,714 B1
(45) Date of Patent: Feb. 12, 2002

(54) PART SORTING AND ALIGNING APPARATUS

(75) Inventor: Joseph Paul Schmitz, Waterloo, IA (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 09/570,858

(22) Filed: May 12, 2000

(51) Int. Cl.[7] .......................... B65G 47/24; B65G 47/44
(52) U.S. Cl. ............. 198/389; 198/397.02; 198/397.03; 221/165
(58) Field of Search .................. 198/382, 383, 198/389, 392, 393, 397.01, 397.02, 397.03, 397.05; 221/165

(56) References Cited

U.S. PATENT DOCUMENTS

| | | | |
|---|---|---|---|
| 887,298 A | 5/1908 | Wilmore | |
| 2,635,261 A | 4/1953 | Stewart et al. | |
| 2,998,119 A | 8/1961 | Winberg | 198/33 |
| 3,033,343 A | 5/1962 | Hansel et al. | 198/30 |
| 3,249,203 A | 5/1966 | Aidlin | 198/33 |
| 3,254,753 A | 6/1966 | Aidlin | 198/33 |
| 3,338,372 A | 8/1967 | Mateling | 198/33 |
| 3,349,891 A * | 10/1967 | Burgess, Jr. | |
| 3,517,796 A | 6/1970 | Aidlin et al. | 198/33 |
| 3,568,882 A | 3/1971 | Aidlin | 221/164 |
| 3,658,207 A * | 4/1972 | Schultz | |
| 3,698,537 A | 10/1972 | Black et al. | 198/33 |
| 3,791,537 A | 2/1974 | Conklin | 214/6.5 |
| 4,027,759 A * | 6/1977 | Van Deberg | |
| 4,312,438 A | 1/1982 | Vatsvog | 198/392 |
| 4,434,885 A | 3/1984 | Brugman et al. | 198/388 |
| 4,461,380 A * | 7/1984 | Grikis | |
| 5,806,654 A | 9/1998 | Largent | 198/392 |

FOREIGN PATENT DOCUMENTS

FR    1 059 127 A    3/1954

OTHER PUBLICATIONS

Link Inc. Products, Step Feeder 'A–Series–Pneumasort', Published Date Unknown, pp. 1–4.

* cited by examiner

Primary Examiner—Joseph D. Pape
Assistant Examiner—Scott Carpenter

(57) ABSTRACT

A part sorting and aligning apparatus for picks parts out of a hopper, aligns the parts and conveys them to another location. The apparatus includes a tilted rotary wheel next to the hopper. Multiple arrays of hooks or pickup members are mounted for rotation on the wheel. The bottom of the hopper has a sliding plate which has slots through which the hooks travel as the hooks move upwardly into and through the hopper. Each pickup member has a weight bar which hangs from the pickup member. As the wheel rotates, the hooks engage and pick up parts as the hooks move upwardly through the hopper. The weight bar maintains a desired orientation of the hooks and the parts as the wheel rotates. Pair of rails pick the parts off of the hooks, so that the parts can be transferred to another location.

12 Claims, 4 Drawing Sheets

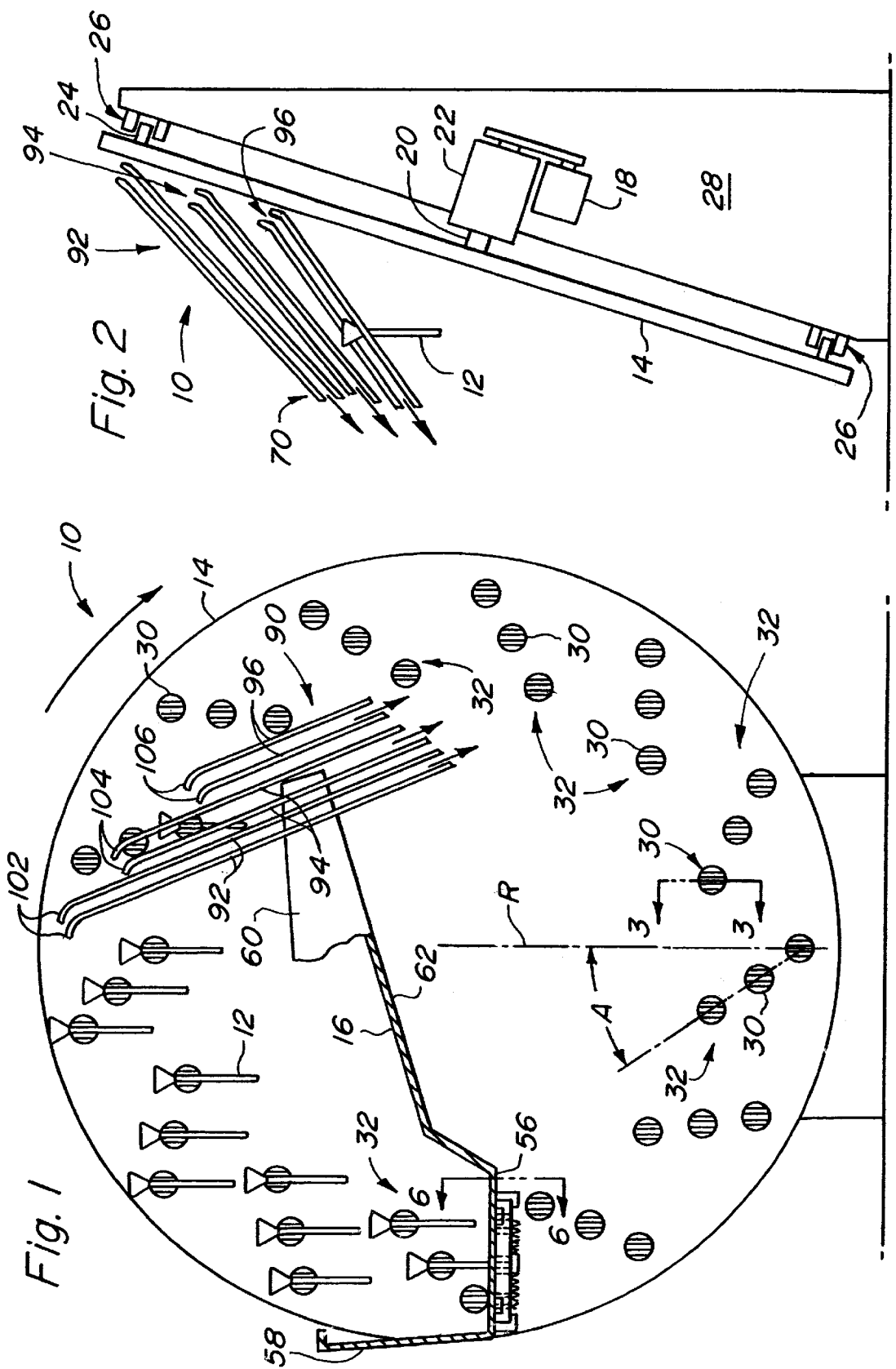

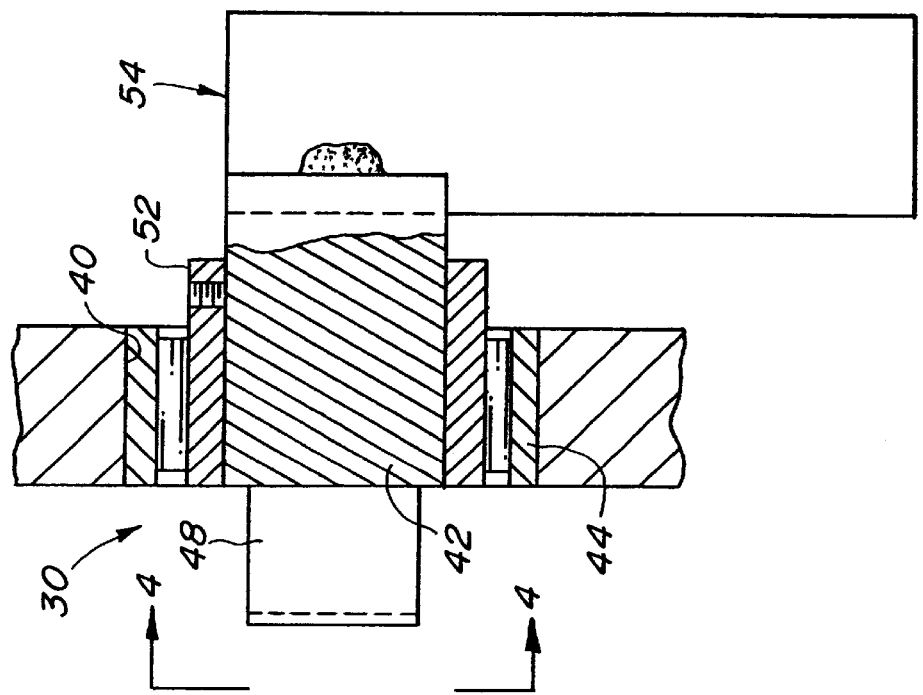
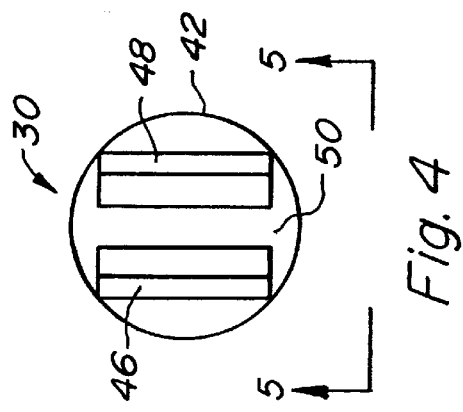
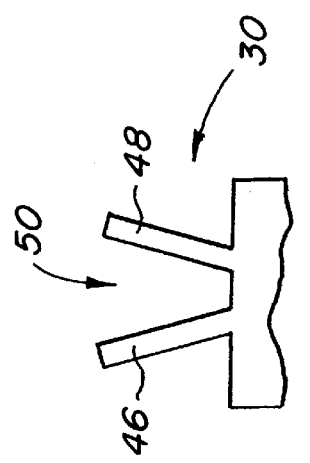

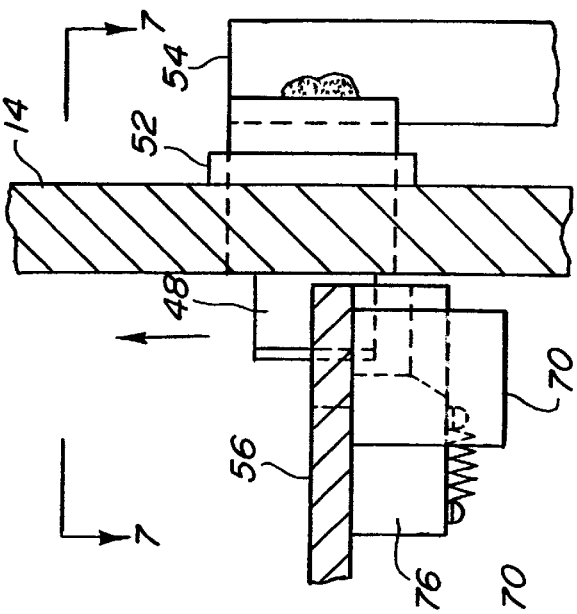
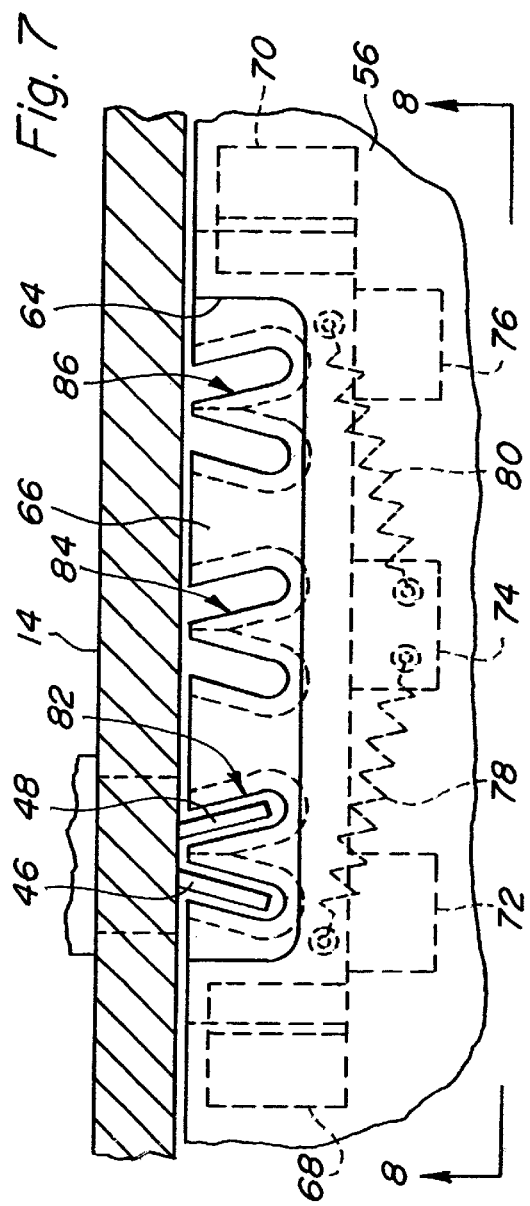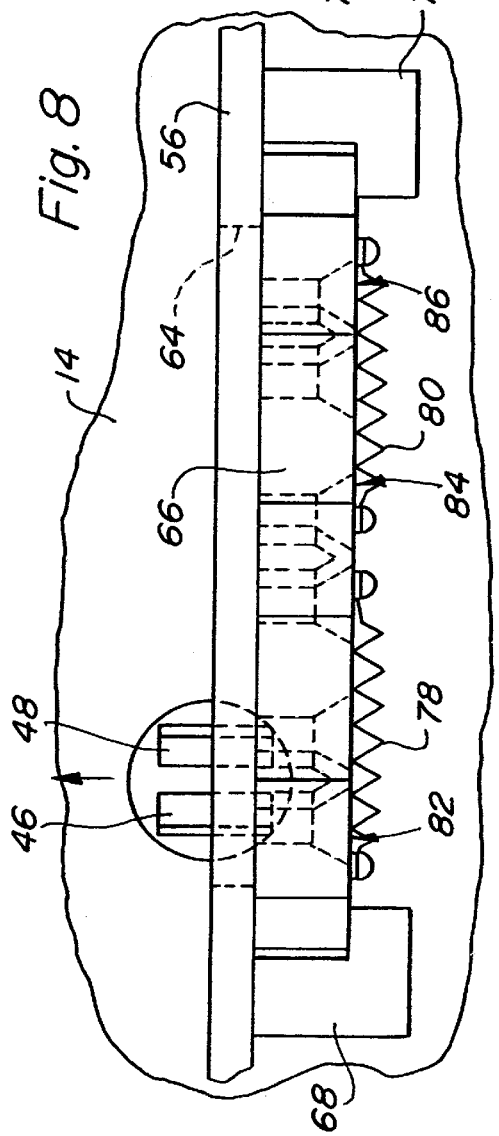

PART SORTING AND ALIGNING APPARATUS

BACKGROUND OF THE INVENTION

The invention relates to a part sorting and aligning apparatus.

Machines are commercially available which extract parts from a pile and place them in a row for further processing. For elongated parts with heads and stems, such as engine valves or bolts, separating conveyors are commercially available from Spectrum Automation Company, and step feeders are available from companies such as Koeberlein. But, after the parts are separated, the parts must be oriented and aligned prior to further processing or machining. Typically, this is accomplished by placing the valves into a "V" channel and vibrating them until they fall into a correct orientation for movement onto a conveyor. Valves which are not correctly aligned fall back into the original pile for later pickup. Currently, parts, such as engine valves, are separated using a vibratory separator. But, the use of a vibratory separators increases maintenance expenses, and increases set up expenses because minor changes in part characteristics requires a new vibratory machine set up. Also, many parts which do not fall back into the machine have to be manually picked up from around the machine.

A prong sorting apparatus is described in U.S. Pat. No. 2,998,119, issued Aug. 29, 1961 to Winberg. The '119 apparatus includes a tilted rotary hopper with a flat bottom disk or wheel surrounded by a skirt. A plurality of pegs are arranged on the bottom. The pegs engage and pick up prongs from a hopper positioned adjacent to the hopper. A single rail pick-off or transfer member receives successive prongs from the pegs for transporting the pegs to another location. The pegs and the transfer member of the '119 apparatus are not capable of picking up or transferring elongated parts with heads and stems, such as engine valves. It would be desirable to have a part sorting and aligning apparatus which can pick up and align engine valves and which does not require a vibratory machine.

SUMMARY OF THE INVENTION

Accordingly, an object of this invention is to provide a part sorting and aligning apparatus which can pick up and align elongated parts with heads and stems, such as engine valves.

A further object of the invention is to provide such a part sorting and aligning apparatus which does not require a vibratory machine.

These and other objects are achieved by the present invention, which comprises a part sorting and aligning apparatus which can pick up and align elongated parts with heads and stems, such as engine valves. The part sorting and aligning apparatus includes a tilted rotary wheel positioned adjacent a supply of valves. The wheel is rotated by a motor acting through a speed reducer. Part pickup members are pivotally mounted on the wheel via bearings, and include a weighted bar so that gravity maintains the pickup members and the valves in a desired orientation as the wheel rotates. The pickup members are arranged in a plurality of arrays which are spaced apart and evenly distributed over the outer portion of the wheel. Pairs of pick-off rails are positioned to pick the valves off of each pickup member of each array so that the valves slide down the rails and away from the wheel.

BRIEF DESCRIPTION OF THE DRAWINGS

FIG. 1 is a front view of a part sorting and aligning apparatus according to the present invention;

FIG. 2 is a side view of the part sorting and aligning apparatus of FIG. 1;

FIG. 3 is a sectional view taken along lines 3—3 of FIG. 1; and

FIG. 4 is a view taken along line 4—4 of FIG. 3;

FIG. 5 is a view taken along line 5—5 of FIG. 4;

FIG. 6 is a view taken along line 6—6 of FIG. 1; and

FIG. 7 is detailed top view in the direction of arrows 7—7 of FIG. 6; and

FIG. 8 is a view taken along line 8—8 of FIG. 7; and

DESCRIPTION OF THE PREFERRED EMBODIMENT

Figure 9:
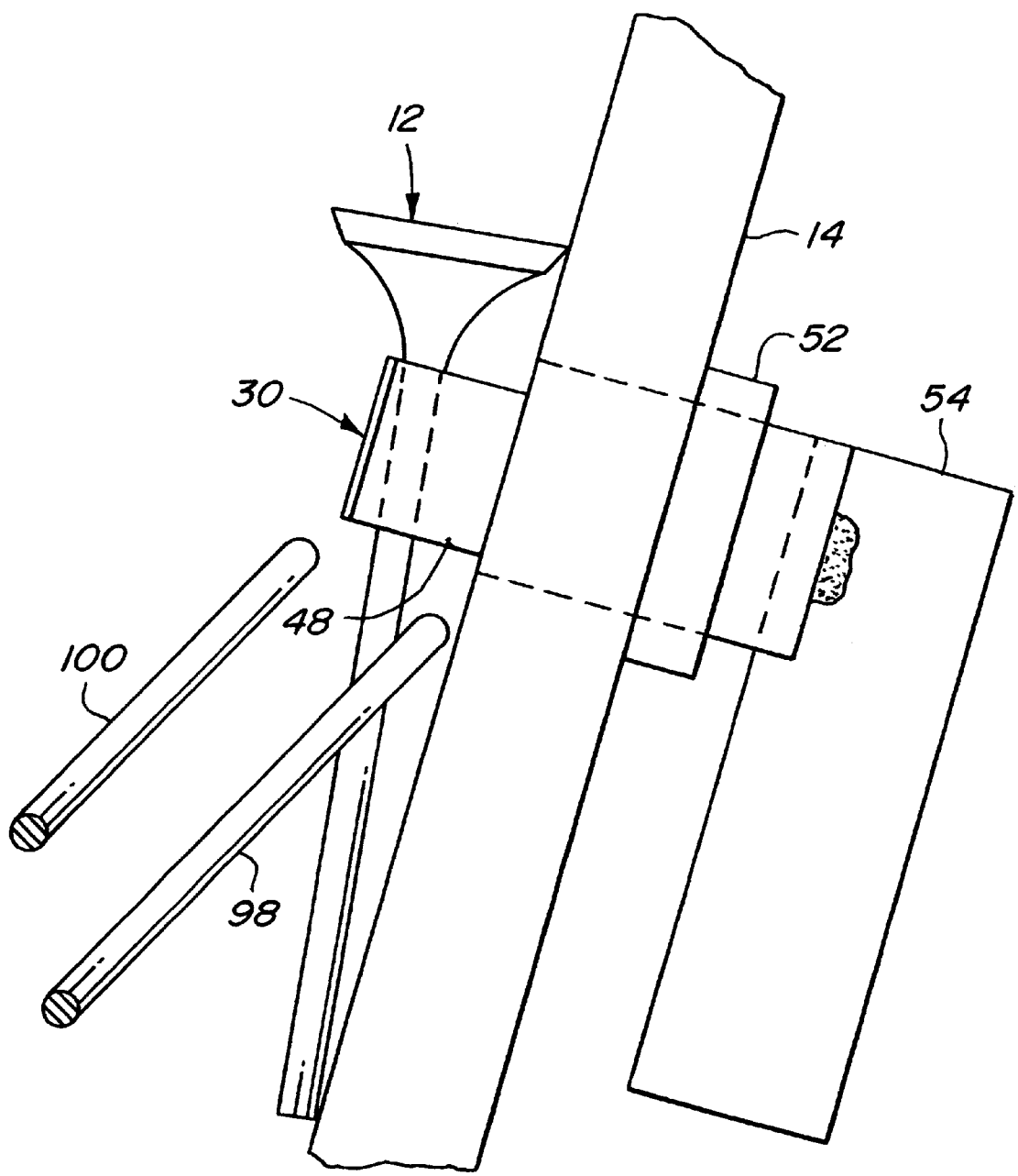
FIG. 9 is an enlarged view of a portion of FIG. 2.

Referring to FIGS. 1 and 2, a part sorting and aligning apparatus 10 is designed for picking parts, such as engine valves 12, out of a pile of valves, aligning or orienting the valves and conveying the valves to another location. The apparatus 10 includes a tilted disk or wheel 14 mounted for rotation adjacent to a valve holding member or hopper 16. The wheel 14 is rotated by a motor 18 which is coupled to a central shaft 20 of the wheel via a speed reducer 22. A cylindrical annular rim 24 projects axially away from the motor side of the wheel 14. The rim is received by guides 26 which are supported by a base 28. The motor can be an electric motor, a hydraulic motor or the equivalent.

A plurality of valve pickup members or hooks 30 are mounted for rotation on the wheel 14, preferably in a plurality of arrays 32 spaced apart around the surface of the wheel 14. Preferably, as best seen in FIG. 1, each array 32 extends from an outer point near an outer edge of the wheel member 14 to an inner point positioned radially inwardly from the outer point, and each array 32 forms an array line which is at an angle with respect to a radial line R extending from the outer point to a center of the wheel 14.

As best seen in FIGS. 3, 4 and 5, each pickup member or hook 30 is received by a corresponding bore 40 which extends axially through the wheel 14. Each pickup member 30 includes a cylindrical shaft 42 received by a bearing 44 which is mounted in the bore 40. Each pickup member 30 also includes a pair of arms 46, 48 which extend away from the shaft 42 and form a generally V-shaped structure with a slot 50 therebetween, as best seen in FIG. 5. A cylindrical locking collar 52, (such as are commercially available from most bearing manufacturers) is mounted on the end of the shaft 42 opposite the arms 46, 48. The collar 52 has an outer diameter which is larger than a diameter of the shaft 42. The upper end of a weight bar 54 is attached, such as by welding to the end of shaft 42. Since the bearing 44 permits the pickup members 30 to freely rotate with respect to the wheel 14, the weight of the bar 54 tends to cause the bar 54 to hang vertically downwardly from its upper end as the wheel 14 rotates. This helps to maintain the pickup member 30 oriented so that the slot 50 extends generally vertically, and so that the valves 12 held by the pickup members 30 will also hang in a substantially vertical orientation, as seen in FIGS. 1 and 4.

Hopper 16 includes a bottom wall 56 and three side walls 58, 60 and 62, and is open towards the wheel 14. As best seen in FIGS. 6–8, the bottom wall 56 has an opening 64 against which is slidably mounted a plate 66. As best seen in FIGS. 7 and 8, the ends of the plate 66 are supported by L-shaped support members 68 and 70 which are attached to the bottom of wall 56 outwardly from the ends of the opening 64. The plate 66 is also held between the surface of the wheel 14 and three stop members 72, 74 and 76, which are attached to the bottom of wall 56 near the side of opening 64 opposite from wheel 14. A pair of springs 78 and 80 are coupled between the plate 66 and the middle stop 74 and are biased to urge the plate 66 towards a centered position. The distance between the members 68 and 70 is larger than the length of plate 66 so that the plate 66 can slide back and forth therebetween.

The plate 66 has three pairs of slots 82, 84 and 86 which are oriented and spaced apart so that the arms 46, 48 of the hooks 30 can move therethrough as the wheel 14 rotates. If each array 32 includes fewer or more than three hooks, then the plate 66 should have a corresponding number of slot pairs. Preferably, as best seen in FIGS. 7 and 8, the slots have a narrow upper end and a wider lower end. This feature, together with the sliding action of the plate 66 helps assure that the hooks 30 can easily enter and move upwardly through the slots.

A part transfer or pick-off assembly 90 is also positioned adjacent the wheel 14. Preferably, the transfer assembly 90 includes a plurality of pairs of rails 92, 94 and 96. Each pair of rails has an upper end 102, 104, 106 positioned adjacent an upper part of the wheel 14 and (as best seen in FIG. 9) slightly below the bottom of the corresponding pickup member 30 when the pickup member 30 is at or slightly past the top of its arc as the wheel 14 rotates. Each pair of rails extends away from its upper end 102, 104, 106, downwardly, away from the wheel 14 and generally in a direction of rotation of the upper part of the wheel 14, as best seen in FIGS. 1, 2 and 9. As best seen in FIG. 9, each pair of rails includes an inner rail 98 and an outer rail 100 spaced apart from and parallel to the inner rail 98. The opening or slot between rails 98 and 100 receives a valve 12 and positioned so that adjacent pairs of rails will engage and pick the valves 12 off of the pickup members 30 as each pickup member 30 is moved into a position adjacent to the upper ends 102, 104 and 106 of the rail pairs 92, 94 and 96.

As the motor 18 rotates the wheel 14, the arms 48, 50 of each pickup member or hook 30 move through the slots 82, 84 and 86 in the plate 66 so that pickup members 30 engage and pick up valves 12 as they move generally upwardly. The valves 12 remain in a substantially vertical orientation as the wheel 14 rotates clockwise, viewing FIG. 1. Eventually, as each valve 12 and hook 30 are near the top of their arc as the wheel 14 rotates, each valve 12 will be picked off of its hook 30 by a corresponding pair of the rails 92, 94, 96. Whereupon the valves 12 slide down between the rail pairs and away from the wheel 14.

While the present invention has been described in conjunction with a specific embodiment, it is understood that many alternatives, modifications and variations will be apparent to those skilled in the art in light of the foregoing description. For example, the present invention could be used to pick up and orient parts with heads and stems, other than engine valves. Accordingly, this invention is intended to embrace all such alternatives, modifications and variations which fall within the spirit and scope of the appended claims.

What is claimed is:

1. A part sorting and aligning apparatus for picking parts out of a group of parts in a hopper, aligning the parts and conveying the parts to another location, comprising:

a tilted rotary wheel member positioned adjacent the hopper;

a part pickup member mounted for rotation on the wheel, the pickup member including a weight bar which hangs from the pickup member;

a transfer member positioned adjacent the wheel, the transfer member comprising a pair of rails; and a motor for rotating the wheel member, the pickup member engaging and picking up a part as the pickup member moves through the group of parts, the weight bar maintaining a desired orientation of the pickup member and the parts, and causing the pickup members to pivot with respect to the wheel member to orient the parts as the wheel member rotates, the pair of rails picking the parts off of the pickup members, and the parts sliding between the rails to the other location.

2. The part sorting and aligning apparatus of claim 1, wherein:

a plurality of bores extend through the wheel member; and each pickup member is received by a corresponding one of the bores.

3. The part sorting and aligning apparatus of claim 2, wherein each pickup member comprises:

a cylindrical shaft received by one of the bores; and a pair of arms extending away from the shaft and forming a generally V-shaped structure.

4. The part sorting and aligning apparatus of claim 2, wherein each pickup member comprises:

a cylindrical shaft received by one of the bores;

a pair of arms extending away from one end of the shaft and forming a generally V-shaped structure; and a cylindrical cap on the other end of the shaft, the cap having a diameter which is larger than a diameter of the shaft.

5. The part sorting and aligning apparatus of claim 1, wherein:

the hopper 16 has a bottom wall 56, the bottom wall 56 forming an opening 64; and a plate 66 is slidably mounted to the bottom wall adjacent to the opening 64, the plate having a slot through which the pickup member moves as the wheel rotates.

6. The part sorting and aligning apparatus of claim 5, wherein:

a pair of springs 78 and 80 are coupled between the plate 66 and the bottom wall and are biased to urge the plate 66 towards a centered position.

7. The part sorting and aligning apparatus of claim 1, wherein:

each bore in the wheel member receives a bearing member, and each bearing member receives a corresponding one of the pickup members so that each pickup member freely rotates with respect to the wheel member.

8. The part sorting and aligning apparatus of claim 1, wherein:

the pickup members form a plurality of arrays on a surface of the wheel member, each array extending from an outer point near an outer edge of the wheel member to an inner point positioned radially inwardly from the outer point.

9. The part sorting and aligning apparatus of claim 8, wherein:

each array includes a plurality of pickup members.

10. The part sorting and aligning apparatus of claim 8, wherein:

each array forms an array line which is at an angle with respect to a radial line extending from the outer point to a center of the wheel member.

11. The part sorting and aligning apparatus of claim 1, wherein:

the transfer member comprises a plurality rails, adjacent pairs of said rails picking off parts from different sets of said pickup members.

12. The part sorting and aligning apparatus of claim 1, wherein:

the hopper is open on a side facing towards the wheel, and the hopper has a bottom wall, the bottom wall having an opening through which the pickup member moves as the wheel rotates.

\* \* \* \* \*